United States Patent [19]

Sekora

[11] 4,279,338

[45] Jul. 21, 1981

[54] APPARATUS FOR SPLITTING A STREAM OF PARTICULATE SOLIDS

[75] Inventor: Robert H. Sekora, Greensburg, Pa.

[73] Assignee: Conoco, Inc., Stamford, Conn.

[21] Appl. No.: 97,078

[22] Filed: Nov. 23, 1979

[51] Int. Cl.³ .............................................. B65G 47/19
[52] U.S. Cl. .................................... 198/525; 198/445; 198/836
[58] Field of Search ............... 198/525, 529, 533, 453, 198/836, 362, 445, 447, 339; 193/29

[56] References Cited

U.S. PATENT DOCUMENTS

| 2,973,109 | 2/1961 | Gable .............................. 198/445 X |
| 4,010,857 | 3/1977 | Reim et al. ..................... 198/339 X |
| 4,029,197 | 6/1977 | Clark et al. ..................... 198/836 X |

FOREIGN PATENT DOCUMENTS 1185180  6/1959  France ..................... 198/525

Primary Examiner—Robert B. Reeves
Assistant Examiner—Douglas D. Watts
Attorney, Agent, or Firm—F. Lindsey Scott; William A. Mikesell, Jr.

[57] ABSTRACT

An apparatus for dividing a stream of particulate solids into a plurality of streams of particulate solids the apparatus comprising a belt conveyor having a leveler positioned above the belt surface to level the particulate solids on the belt surface so that the solids are discharged into a plurality of chutes to produce a plurality of streams each of which comprises a portion of the feedstream equal to a fraction defined by the width of the chute divided by the width of the belt conveyor.

5 Claims, 5 Drawing Figures

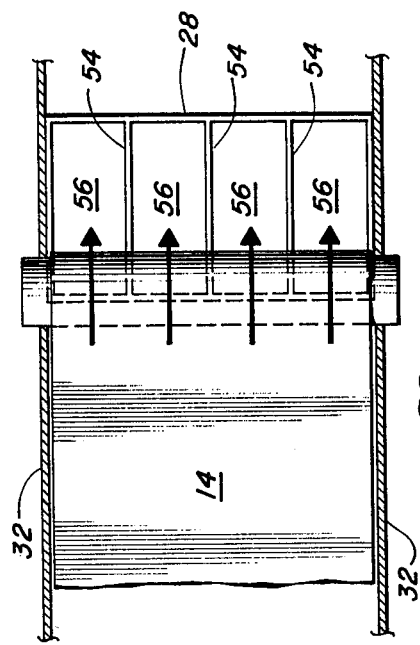
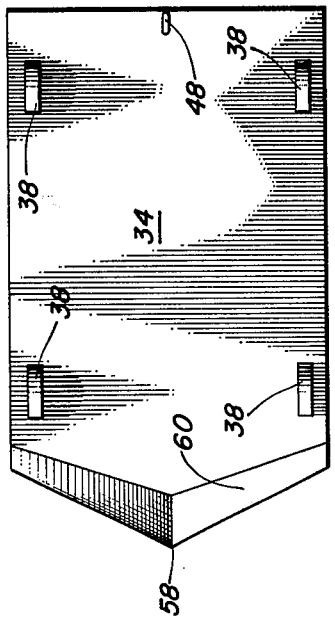
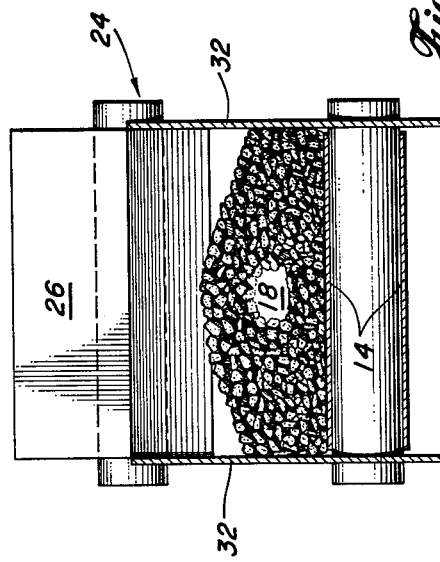
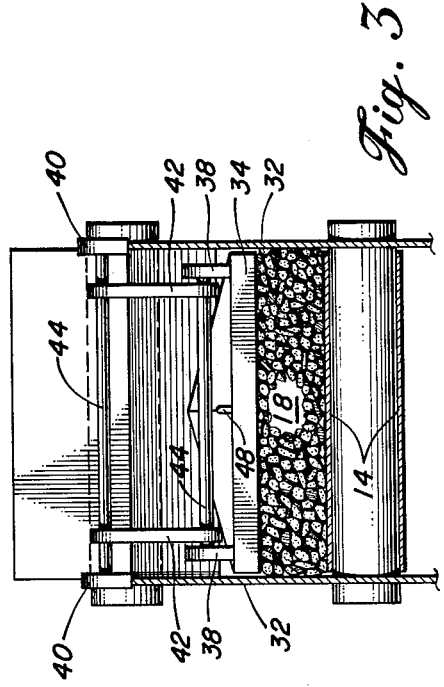

APPARATUS FOR SPLITTING A STREAM OF PARTICULATE SOLIDS

This invention relates to apparatus for dividing streams of particulate solids.

This invention further relates to apparatus for dividing feedstreams of particulate solids by the use of belt conveyors.

In a variety of processes such as ore processing, coal processing and the like, particulate solids are handled by the use of belt conveyors and the like. There has been an increasing effort to develop reliable and accurate apparatus for dividing such streams of solids. Some methods and apparatus used in such processes are disclosed in the following references which were considered in the preparation of the present application.

| Patent No. | Issue Date | Patentee |
|---|---|---|
| 2,589,690 | 3/18/52 | Graetz |
| 2,758,700 | 8/14/56 | Plumb |
| 3,216,464 | 11/9/65 | Horst |
| 3,319,768 | 5/16/67 | Holzhauer et al. |
| 3,399,466 | 9/3/68 | Hartley |
| 3,810,537 | 5/14/74 | Hungtington |
| 3,826,354 | 7/30/74 | Patz |
| 3,986,622 | 10/19/76 | Vaughan et al. |
| 4,096,793 | 6/27/78 | Wachter et al. |
| 4,135,615 | 1/23/79 | Brackmann et al. |
| 4,146,123 | 3/27/79 | Cottrell |

It has now been found that such streams of particulate solids are readily divided into a plurality of streams by the use of a belt conveyor which conveys the solids past a leveler plate which levels the particulate solids on the conveyor belt for discharge into a receiver which comprises a plurality of chutes. The chutes are of a predetermined width so that each of the plurality of streams constitutes a portion of the feedstream equal to the fraction defined by the width of the chute divided by the width of the conveyor belt.

FIG. 2 is a cross-sectional view taken at Section 2—2 of FIG. 1;

FIG. 3 is a cross-sectional view taken at Section 3—3 of FIG. 1;

FIG. 4 is a top view showing the chutes in FIG. 1; and;

FIG. 5 is a top view of the leveler plate shown in FIG. 1.

In the discussion of the figures the same numbers will be used to refer to the same or similar components throughout the discussion.

Figure 1:
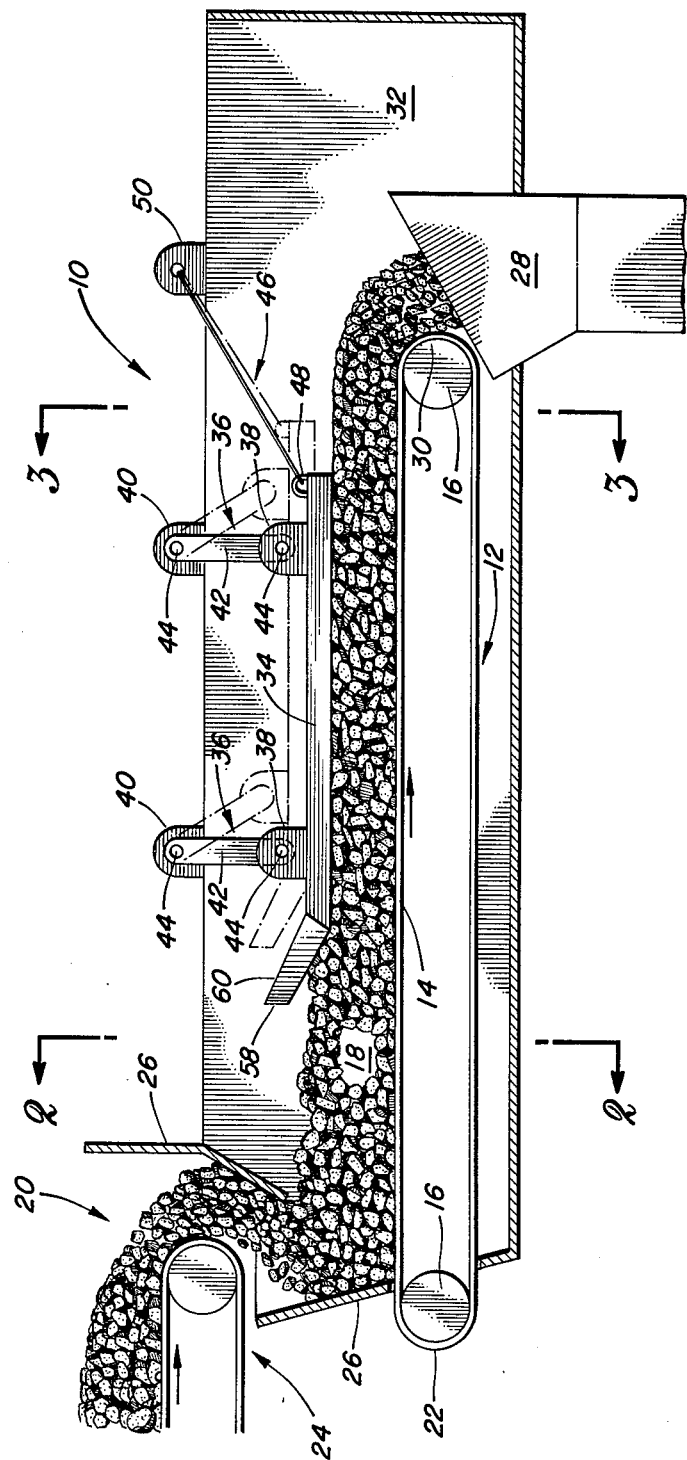
FIG. 1 is a schematic diagram of an embodiment of the present invention.

In FIG. 1 an embodiment of the solids stream splitter apparatus 10 of the present invention is shown. Apparatus 10 comprises a belt conveyor 12 comprising rollers 16 and a belt 14. Solids 18 are shown passing along the length of belt 14 to discharge. A feeder 20 which is shown as a feeder chute but which may be any suitable feeder means is positioned near a first end 22 of conveyor 12 and comprises a belt conveyor 24 which discharges via a feed chute 6 onto belt 14. A discharge chute 28 is positioned to receive a discharge of particulate solids 18 from a second end 30 of belt conveyor 12. Sidewalls 32 are positioned on each side of belt conveyor 12 to maintain particulate solids 18 on belt 14. A leveler plate 34 is pivotally positioned above belt 14 at a height suitable to level solids 18. As shown in FIG. 1 leveler plate 34 is pivotally supported above belt 14 by leveler plate supports 36. Supports 36 comprise leveler plate brackets 38 positioned on leveler plate 34, sidewall brackets 40 positioned on sidewalls 32 and support rods 42 pivotally joined by pins 44 to leveler plate brackets 38 and sidewall brackets 40. A leveler plate controller 46 is also provided and comprises a leveler plate connector 48 and a fitting 50 positioned on sidewall 32 to adjust the level of leveler plate 34 above belt 14.

In FIG. 2, the profile of the particulate solids positioned on belt 14 ahead of leveler plate 34 is shown.

FIG. 3 shows the operation of leveler plate 34 in leveling particulate solids 18 across the width of belt 14.

FIG. 4 shows a embodiment wherein the particulate solid stream is divided into four equal streams by the use of dividers 54 to define four chutes 56 which are of equal width. While not shown, the chutes can be adjustable both as to size and number. Moveable dividers can be used and the number of dividers can be varied. As the solids pass leveler plate 34 and discharge into chute 28, the width of the chutes accurately divides the particulate solids into a plurality of streams equal to a fraction of the total particulate solid stream defined by the width of the chute divided by the width of belt 14. Clearly, suitable division is not accomplished unless a leveling means is provided upsteam of the discharge.

FIG. 5 is a top view of leveler plate 34 showing a plow 60 positioned thereon. Plow 60 comprises a point 58 which is elevated above the level of leveler plate 34. It has been found that it is desirable that the plow be pointed, rounded or otherwise shaped to facilitate the movement of solids across the width of belt 14 as they pass beneath leveler plate 34. Desirably plow 60 is slightly upturned so that no solids pass over the upper surface of leveler plate 34. Leveler plate 34 is desirably of a width suitable for leveling the solids across substantially the whole width of belt 14.

In the operation of the apparatus of the present invention, particulate solids are discharged from chute 26 onto belt 14 and passed along the length of belt 14 to discharge into chutes 28. Leveler plate 34 is adjusted to a height such that it tends to float on solids 18 on belt 14 rather than functioning as a dam to impede flow of solids along belt 14. To accomplish this objective plate 34 is normally relatively heavy and being pivotally mounted is free to move according to the height of the solids passing beneath plate 34 on belt 14. The level at which plate 34 is operated may be used as a flow rate indicator if it is wished to determine the volume of the stream of particulate solids flowing on conveyor 12. Controller 46, may be a wire connection of sufficient strength to pull plate 34 back to a desired position when the level is increased or it may be a suitable spring arrangement to reduce the effective weight of plate 34. In any event 34 is arranged to move pivotally toward second end 30 of belt conveyor 12 as the flow increases either as a result of the increased flow or if desired by the use of controller 46. It is desirable that plate 34 bear upon the particulate solids only to the extent necessary to level the flow across the width of belt 14. The leveled solids then passing along belt 14 are substantially level and are readily divided into a plurality of steams by the use of sized chutes as discussed. The chutes may be of the same or different sizes with the proportion of each stream being defined as a fraction of the whole defined by the width of the chute divided by the width of the conveyor belt.

Having thus described the present invention by reference to certain of its preferred embodiments it is pointed out that the embodiments discussed are illustrative rather than limiting in nature and many variations and modifications are possible within the scope of the present invention.

Having thus described the invention, I claim:

1. An apparatus for dividing a feed stream of particulate solids into a plurality of streams of said particulate solids, each of said plurality of streams constituting a predetermined portion of said feed stream, said apparatus comprising;
   (a) a flat belt conveyor means adapted to convey particulate solids from a first end of said belt conveyor means toward a second end of said belt conveyor means;
   (b) a substantially vertical sidewall positioned on each side of said belt conveyor;
   (c) a leveler plate means pivotally positioned above said belt conveyor means to level said particulate solids on said belt conveyor means so that said particulate solids are of a uniform depth across the width of said belt conveyor, said leveler plate being of substantially the same width as said belt;
   (d) a feeder means for charging said particulate solids to said belt conveyor means between said first end of said belt conveyor means and said leveler plate means;
   (e) a receiver means for receiving said particulate solids from said second end of said belt conveyor means, said receiver means comprising a plurality of chutes for receiving said plurality of streams each of said streams constituting a predetermined portion of said feed stream, said predetermined portion being a fractional portion of said feed stream determined by the ratio of the width of each chute to the width of said belt conveyor.

2. The apparatus of claim 1 wherein said leveler plate means comprises a relatively flat portion having a width to level said particulate solids across the width of said belt conveyor means and includes a plow positioned on its end nearest said first end of said belt conveyor to facilitate the leveling of said particulate solids.

3. The apparatus of claim 2 wherein said apparatus includes a leveler plate controller means adapted to adjust the height of said leveler plate means above said belt conveyor means.

4. The apparatus of claim 3 wherein said chute means are of the same size.

5. The apparatus of claim 3 wherein said chute means are of different sizes.

* * * * *